Oct. 19, 1943. A. W. OEHLER 2,332,006
COMBINE
Filed June 30, 1941 4 Sheets-Sheet 1
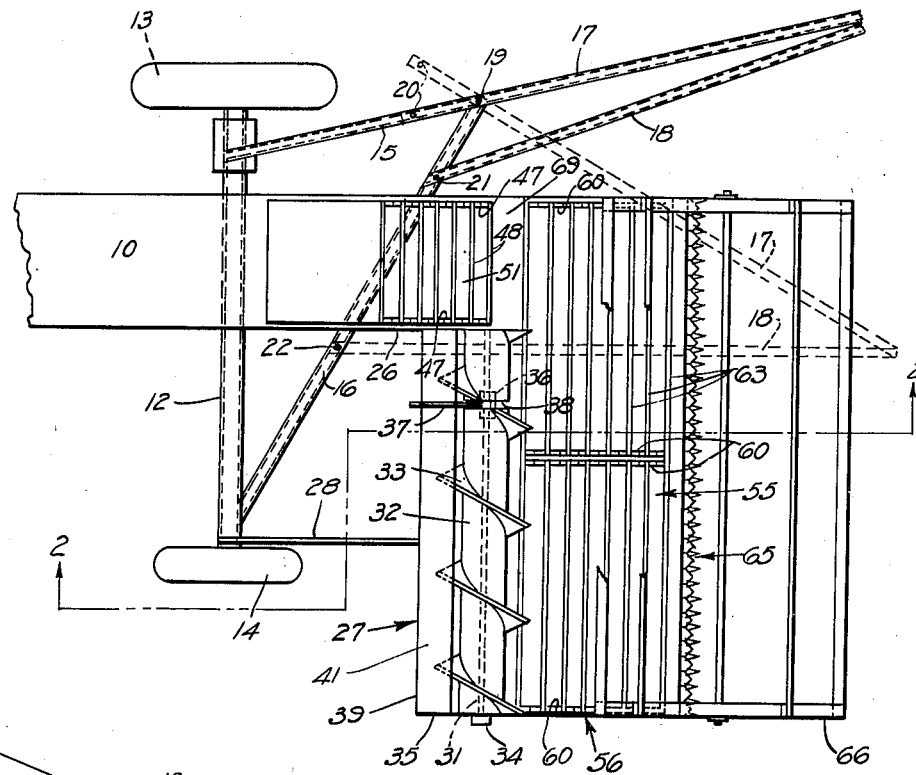
- FIG. 1 -
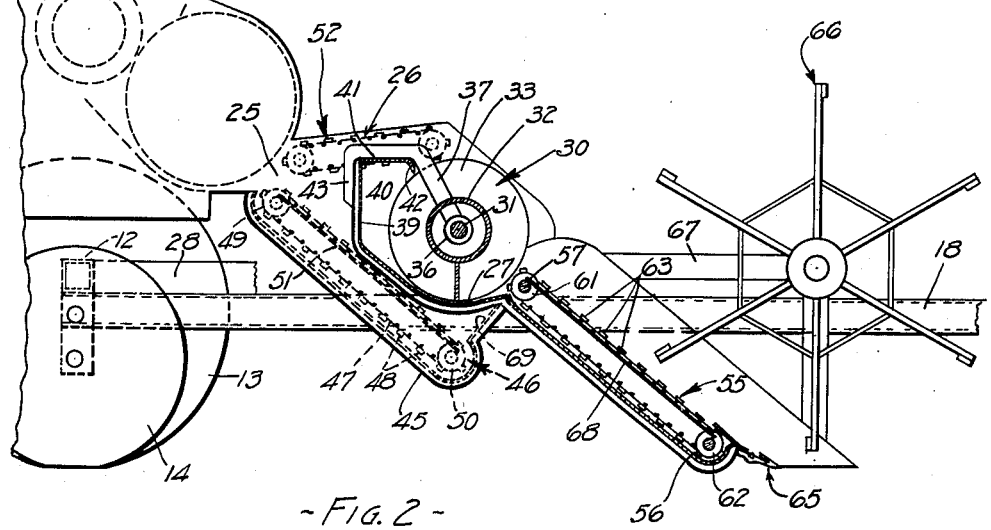
- FIG. 2 -
ALVIN W. OEHLER - INVENTOR.

ALVIN W. OEHLER - INVENTOR.

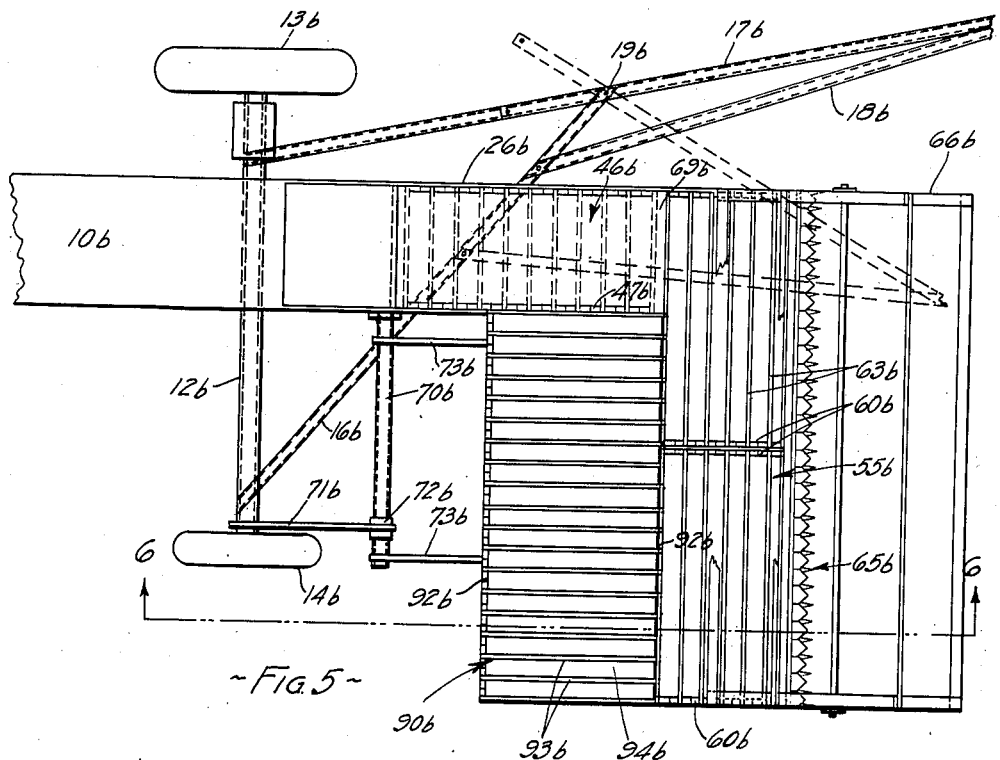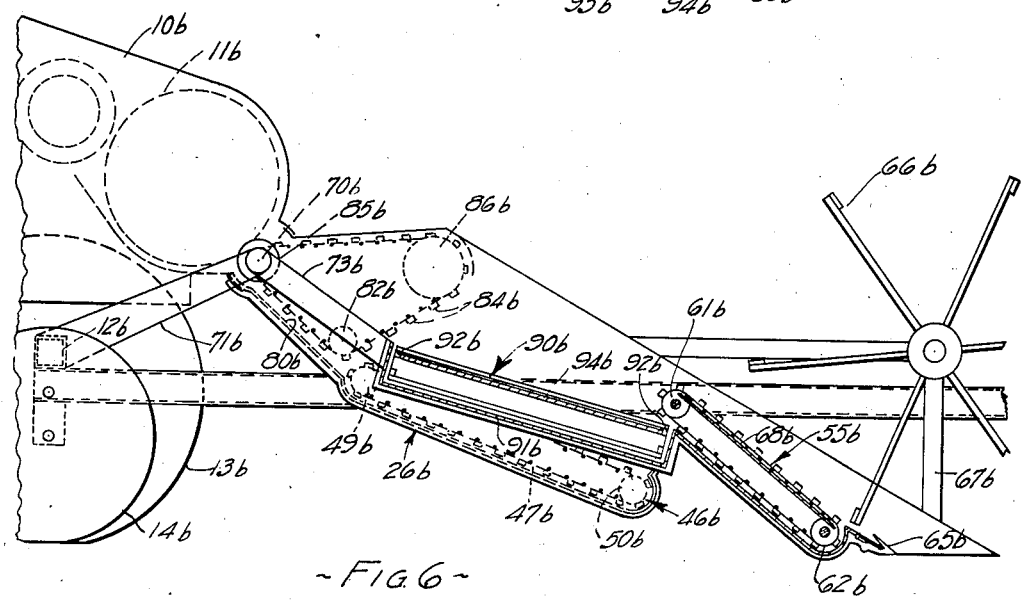

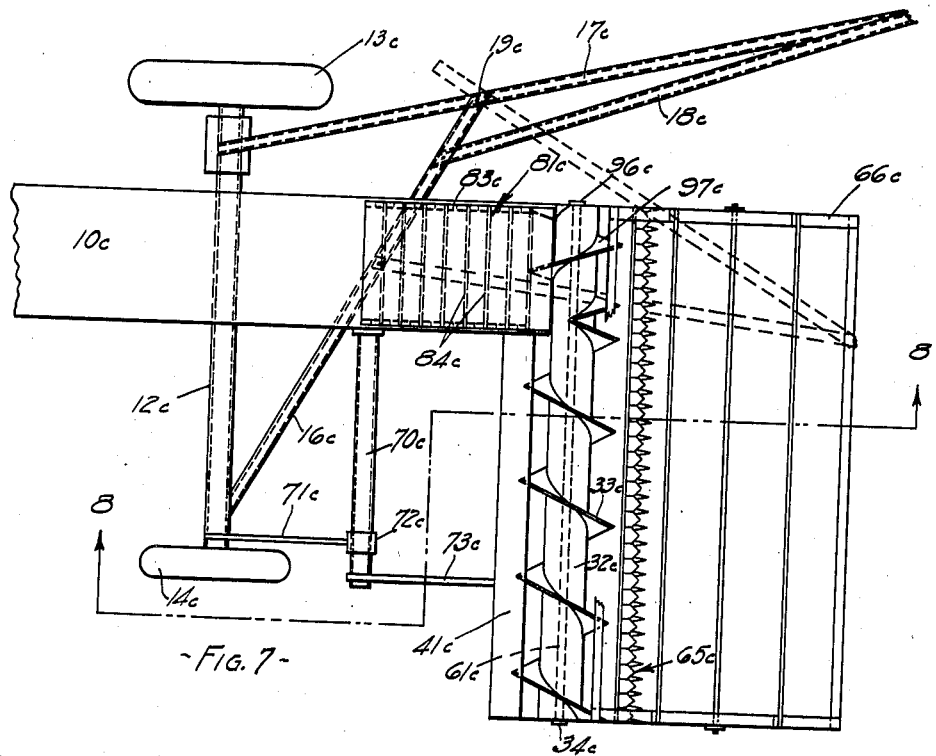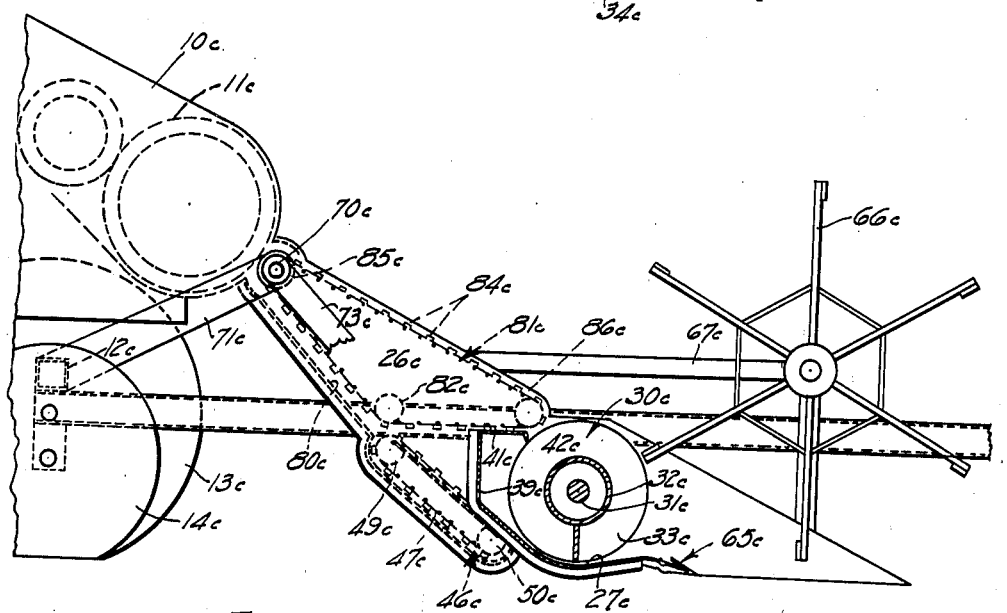

Patented Oct. 19, 1943

2,332,006

UNITED STATES PATENT OFFICE 2,332,006

COMBINE

Alvin W. Oehler, Moline, Ill., assignor to Deere & Company, Moline, Ill., a corporation of Illinois Application June 30, 1941, Serial No. 400,387

14 Claims. (Cl. 56—123)

The present invention relates generally to harvesters and more particularly to harvester threshers and has for its principal object the provision of a novel, improved, and more efficient harvesting mechanism for gathering standing grain from the field and delivering the same to the body of the harvester for threshing or other crop treating process.

A further object of this invention relates to the provision of a harvester in which a maximum width of cut is provided without the necessity of removing a section of the harvester platform for transport purposes.

Conventional combines of the type having an auger conveyor on the platform for delivering the harvested crop laterally to the feeder house, are known to operate with high efficiency in grain which is not too tall, but tall grain when severed, tends to fall back against the back wall of the platform and is not as readily engaged by the auger. It is, therefore, a further object of the present invention to provide a harvester platform having a transverse auger conveyor which will handle grain of all heights. In the accomplishment of this object, the auger is disposed in an elevated position, while the grain is conveyed rearwardly from the cutter bar to the auger by a short length of conveyor of the flexible endless type.

These and other objects and advantages of my invention will be apparent to those skilled in the art after a consideration of the following description in which reference is had to the drawings appended hereto, in which Figure 1 is a plan view of the forward portion of a harvester embodying the principles of my invention;

Figure 2 is a sectional elevational view taken along a line 2—2 in Figure 1 and drawn to an enlarged scale;

Figure 5 is a plan view showing a second modification of my invention;

Figure 6 is a sectional elevational view taken along a line 6—6 in Figure 5 and drawn to an enlarged scale;

Figure 7 is a plan view showing a third modification of my invention; and

Figure 8 is a sectional elevational view taken along a line 8—8 in Figure 7 and drawn to an enlarged scale.

Figure 3:
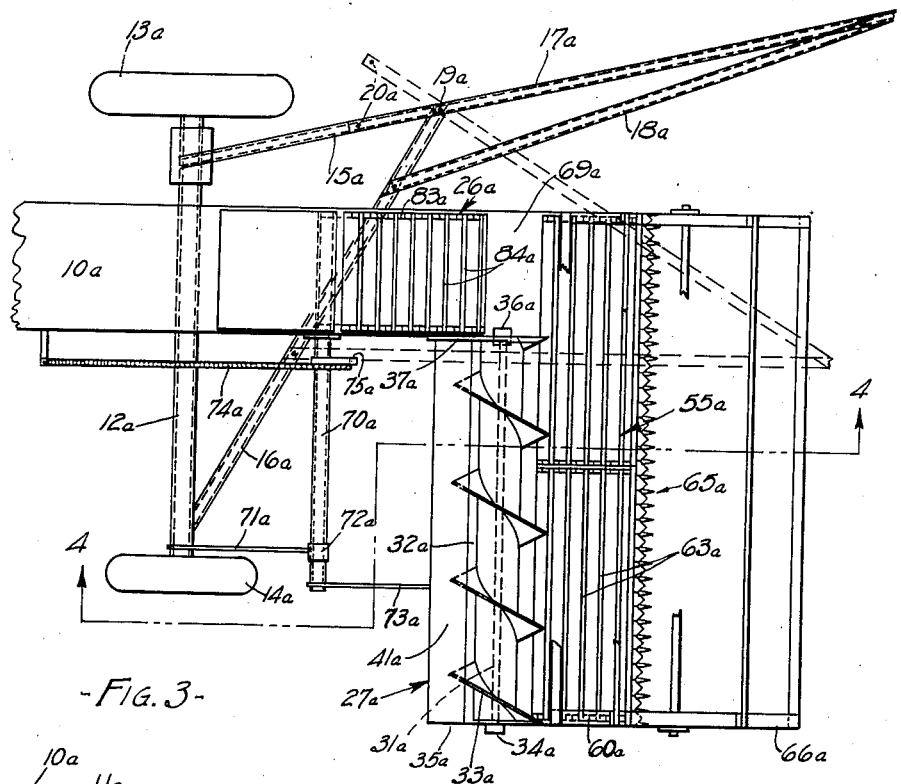
Figure 3 is a plan view showing a modification of my invention.

Referring now to the drawings and more particularly to Figures 1 and 2, the combine comprises a comparatively narrow, fore and aft extending thresher body 10 containing any suitable threshing mechanism 11 or other crop treating apparatus, and mounted on a transversely disposed supporting beam 12, the latter being carried at opposite ends thereof, respectively, on a pair of ground wheels 13, 14. The supporting frame also includes a pair of forwardly extending beams 15, 16 connected at opposite ends of the transverse beam 12, respectively, and converging forwardly and toward the stubbleward side of the combine. Draft force is applied to the frame through a hitch device comprising a pair of forwardly converging hitch members 17, 18. The stubbleward member 17 is pivotally connected to the frame members 15, 16 at their point of convergence by means of a pivot bolt 19 and extends rearwardly to a second bolt connection 20 with the frame member 15. The other hitch member 18 is detachably connected to the frame member 16 by a bolt 21 and is connected to the hitch member 17 at the point of convergence. The hitch device is shown in solid lines in laterally offset relation for normal operation, but can be swung inwardly for transport position by disconnecting the bolt connection 20 and removing the bolt 21, after which the hitch member 17 can be pivoted around the bolt 19 and the hitch member 18 can be reconnected to member 16 by inserting bolt 21 through a hole 22 to secure the hitch members 17, 18 in the transport position shown in dotted lines.

The forward end of the body 10 is provided with an opening 25 for receiving the harvested crop into the crop treating mechanism 11. Extending forwardly from the opening 25 is a feeder housing 26, which is substantially equal in width to the body 10. In this embodiment, the feeder housing 26 is rigidly supported on the forward end of the body 10 and is also rigidly connected to a laterally extending conveyor trough 27, which extends in a grainward direction from the side of the feeder house 26. The outer end of the trough 27 is rigidly braced to the main transverse beam 12 by means of a brace 28.

A transversely disposed auger conveyor 30 is rotatably supported within the trough 27 and comprises a supporting shaft 31, a cylindrical tubular body 32 supported on the shaft by any suitable means, and a helical blade 33 fixed, as by welding, to the outer surface of the cylinder 32. The grainward end of the supporting shaft 31 is journaled in a bearing 34 supported on the end wall 35 of the platform conveyor trough 27, and the opposite end of the shaft 31 is journaled in a bearing 36, spaced from the opposite end of the auger, and supported on a standard 37, which extends outwardly through a slot 38 in the cylinder 32 and inclined upwardly and rearwardly therefrom. The conveyor trough 27 also extends rearwardly of the auger 30 and has a generally vertical back wall 39 which is spaced from the auger 30 to provide a grain pocket 40 through which the harvested crop is moved by the auger when the latter is rotated. The pocket 40 is closed by a generally horizontal, forwardly extending plate 41, fixed to the upper edge of the back wall 39 and having a downwardly turned forward edge 42 closely adjacent the edge of the helical blade 33 and serving as a stripper edge for preventing harvested material from being carried over the top of the auger as the latter revolves. The standard 37 extends over the top of the stripper plate 41 and has a downwardly extending supporting leg 43, which is fixed to the back wall 39 of the conveyor trough. During operation the auger 30 turns in a clockwise direction, as viewed in Figure 2, moving harvested crop material laterally inwardly through the pocket 40 toward the feeder house 26. Since the stripper edge 42 prevents material from being carried over the auger, the material does not become entangled with the bearing standard 37 but is crowded into the pocket 40 and is moved inwardly therealong. The diameter of the cylindrical tubular member 32 is great enough so that stalks and vines have little tendency to wrap around the latter.

The bottom of the feeder house 26 is depressed appreciably below the trough 27, as indicated at 45, and disposed within the feeder house in the lower portion thereof is a flexible endless conveyor 46 comprising a pair of laterally spaced endless chains 47 interconnected by a plurality of spaced slats 48. The chains 47 are trained over a pair of rollers 49, 50 at the upper and lower ends of the feeder house, respectively. The inner end of the auger 30 terminates adjacent the outer side wall of the feeder house, and since the trough 27 communicates with the feeder house 26 at an elevation higher than the upper run of the conveyor 46, the harvester crop material discharged from the end of the auger 30 falls to the upper run of the conveyor 46 which sweeps the crop material upwardly and rearwardly over a deck 51 and delivers the material through the opening 25.

At the rear of the feeder house 26, an upper raddle 52 assists in crowding the crop material into the opening 25.

The harvested crop is delivered to the auger by means of a platform conveyor 55 carried on a vertically adjustable harvester platform, indicated in its entirety by reference numeral 56, and pivotally connected to the forward edge of the trough 27 providing for vertical swinging movement about the transverse axis of a shaft 57. The platform 56 extends transversely across the entire width of the machine including the feeder housing 26 and the auger conveyor trough 27, and the conveyor 55 is substantially coextensive with the width of the platform 56.

The conveyor 55 comprises a pair of flexible endless conveyor sections disposed side by side on the platform 56, each of the sections comprising a pair of laterally spaced chains 60 trained over a pair of upper and lower rollers 61, 62, respectively, which are rotatably mounted on the pivoted platform 56, and each pair of chains 60 is interconnected by a plurality of spaced slats 63.

A conventional cutter bar and sickle, indicated in its entirety by reference numeral 65, extends across the entire width of the platform and coextensive with the platform elevator 55. The crop is severed from the ground by means of the sickle and cutter bar and is laid upon the conveyor 55 by means of a conventional harvester reel 66, rotatably supported on the pivoted platform 65 on suitable standards 67. The upper end of the conveyor 55 sweeps the crop upwardly and rearwardly over a deck sheet 68, and at the upper end of the platform 56 the conveyor 55 discharges the material into the trough 27 and into the feeder house 26. Since the upper end of the platform 56 is substantially at the level of the conveyor trough 27, the portion of the conveyor 55 ahead of the feeder house conveyor 46, is appreciably higher than the latter. For this reason an inclined chute or apron 69 between the upper end of the platform 56 and the conveyor 46, guides the harvested material which is discharged thereon to the upper run of the conveyor 46.

It will be apparent to those skilled in the art, that unusually tall grain can be successfully harvested by the harvester described above, for it falls upon the platform conveyor 55, which delivers it head-first to either the feeder house conveyor 46 or the auger 30 and there is no chance for the tall stalks to lie against the back wall 39 of the trough 27, as sometimes occurs in the conventional auger type platform. The vertically adjustable section of the platform 56 swings about the shaft 57 which is coaxial with the upper conveyor roller 61, and thus the elevation of the cutter bar 65 does not affect the relation between the upper end of the conveyor 55 and the auger conveyor 30, but it will be readily understood that the helical vane 33 acts to strip the crop material from the platform elevator 55. Although the mechanism for raising and lowering the platform is omitted herein for the sake of clearness, it is to be understood that any suitable conventional mechanism can be used for this purpose. Other conventional details of construction have also been omitted in order to simplify the drawings and description.

Figure 4:
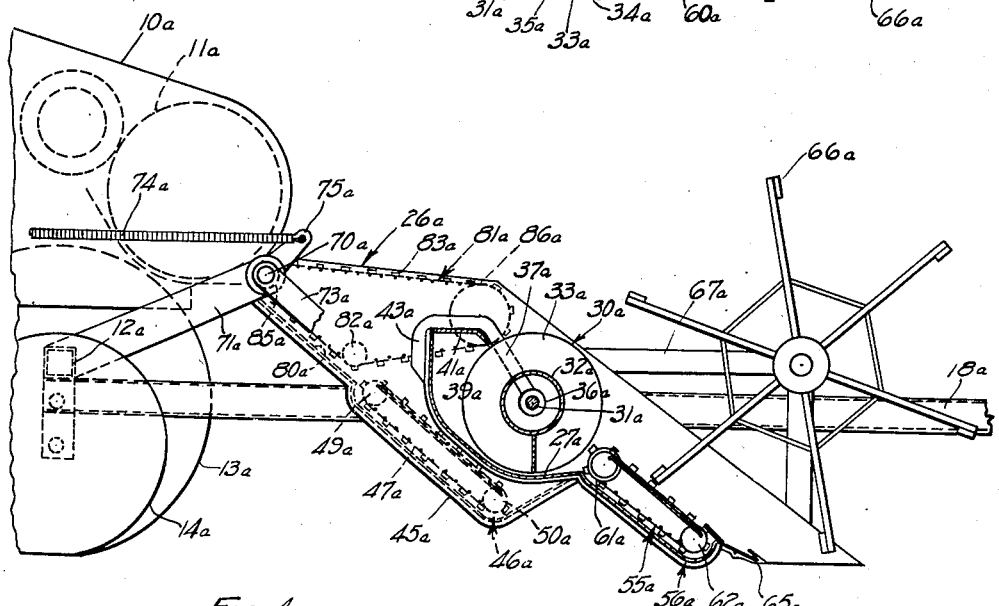
Figure 4 is a sectional elevational view taken along a line 4—4 in Figure 3 and drawn to an enlarged scale.

Referring now more particularly to Figures 3 and 4, many of the details are similar to those in the embodiment of Figures 1 and 2 and have been indicated by similar reference numerals, by the suffix *a*.

This embodiment differs from the embodiment of Figures 1 and 2 in that the forward end 56*a* of the platform is rigidly mounted on the auger trough 27*a* instead of being pivoted as in the foregoing embodiment, so that the auger trough 27*a*, the forward portion 56*a*, and the feeder house 26*a* all comprise one rigid structure which is pivotally connected to the forward end of the body 10*a* for vertical swinging movement about a transverse axis. The unitary platform structure is supported on a transversely disposed pipe bear 70*a*, which is supported on the forward end of the body 10*a* and extends laterally in a grainward direction to an outboard support in the form of an arm 71*a* carried on the transverse beam 12*a* and extending upwardly and forwardly therefrom and having a journal bearing 72*a* at its forward end in which the platform supporting beam 70a is rotatably carried. The grainward end of the platform structure is supported by an arm 73a, which is rigidly fixed to the platform structure and to the extended outer end of the pipe beam 70a. A counterbalancing spring 74a is connected between the thresher body 10a and an arm 75a, which is rigidly attached to the beam 70a.

In this embodiment, the feeder house conveyor 46a terminates approximately mid-way of the latter and deposits the crop material on the floor 80a of the feeder house. The crop material is swept upwardly and rearwardly along the floor 80a of the rear portion of the feeder house 26a into the opening in the body 10a by means of a raddle conveyor 81a, the lower flight of which is inclined over the rear end of the feeder house conveyor 46a, passing under a roller 82a and then rearwardly in spaced relation above the floor 80a to engage the crop material thereon. The conveyor 81a comprises a pair of laterally spaced chains 83a, which are interconnected by a plurality of spaced transverse slats 84a. The conveyor 81a passes over a rear roller 85a, which is journaled coaxially with the pivot axis of the platform structure, and thus does not change its position when the structure is adjusted vertically. From the roller 85a the conveyor is trained forwardly over a comparatively large roller 86a positioned in the upper portion of the feeder house 26a above the feeder house conveyor 46a. It will be noted that the inclined portion of the lower flight of this conveyor acts to strip material from the conveyor 46a and to force it against the rear portion of the floor 80a to compress the material to facilitate feeding into the crop treating mechanism.

This embodiment further differs from that of Figures 1 and 2 in that the inner supporting bearing standard 37a is not positioned intermediate the length of the auger 30a, but is positioned at the inner end of the shaft 31a, at the side of the feeder house. The standard 37a, however, is not appreciably changed in shape, for it extends upwardly and rearwardly over the top of the stripper plate 41a and has a supporting leg 43a extending down the back of the back wall 39a, to which it is rigidly secured.

Referring now more particularly to Figures 5 and 6, this embodiment is similar to the embodiment shown in Figures 3 and 4 except that the auger conveyor has been replaced by a transversely disposed raddle type conveyor, indicated in its entirety by reference numeral 90b. The conveyor 90b comprises a transversely disposed conveyor trough 91b, rigidly supported on the feeder house 26b and extending laterally therefrom in a grainward direction. The trough is supported on a pair of laterally spaced arms 73b, fixed to the transverse supporting beam 70b, which is mounted on the axis of vertical swinging movement of the conveyor structure and carried in an outboard bearing 72b and an arm 71b fixed to the main frame beam 12b. The conveyor 90b also includes a pair of endless chains 92b interconnected by a plurality of spaced slats 93b, which sweep the crop material over a sheet 94b laterally to the feeder house conveyor 46b. In other respects, this embodiment is similar to that of Figures 3 and 4 and therefore corresponding parts are given corresponding reference numerals, to which the suffix b has been added.

Referring now more particularly to Figures 7 and 8 this embodiment has a great number of details in common with Figures 3 and 4 and therefore similar reference numerals with the suffix c have been used. In this embodiment, the forward portion 56 of the platform has been omitted, and the cutter bar 65c is supported along the forward edge of the auger conveyor trough 27c, which, in this embodiment, is extended across the forward end of the feeder house 26c. The auger 30c has also been extended across in front of the feeder house conveyor 46c and the inner end of the auger is journaled in a bearing 96c, supported on the stubbleward wall of the feeder house, extended forwardly to provide an inner end wall to the conveyor trough 27c. The helical vane 33c of the auger extends from the grainward end of the platform to the grainward side of the feeder housing and a reversely wound helical blade 97c extends from the stubbleward end of the platform across the feeder housing to the termination of the blade 33c. It may be desirable to extend the blade 33c across a portion of the feeder house and to terminate the blade 97c ahead of an intermediate portion of the feeder house. The blade 97c assists in sweeping harvested crop from the cutter bar to the feeder house conveyor 46c.

In this embodiment the forward roller 86c of the upper feeder raddle 81c is positioned adjacent the edge of the blade 97c and acts to strip the latter as well as to cooperate with the lower feeder house conveyor 46c to compress the crop material against the floor 80c of the feeder house and to feed the same into the thresher body.

It will be evident to those skilled in the art that a harvester of the type described herein has a width of cut nearly equal to the width of the machine when in transport. With this type of design, however, the threshing cylinder need not be as wide as the platform, thus permitting greater width of cut than is possible with the "straight through" type of harvester.

I claim:

1. A harvester comprising a wheel supported body, a harvester platform having a neck portion substantially equal in width to said body and pivotally connected to the forward end thereof by means providing for vertical swinging movement about a transverse axis, a flexible endless conveyor in said neck portion for moving crops into the body, said platform having a rigid lateral extension beyond one side of said neck portion, a cutter bar extending along the forward end of said platform along the front of said neck portion and said lateral extension, a flexible endless conveyor mounted on the platform behind said cutter bar and coextensive therewith and movable rearwardly and upwardly therefrom substantially in a single plane to discharge a portion of the crops directly upon said conveyor in said neck portion, and a conveyor mounted on said pivoted platform behind said rearwardly movable conveyor for receiving the remainder of the crops therefrom and moving the same laterally to discharge the same upon said conveyor in the neck portion of said platform.

2. A harvester comprising a narrow, longitudinally extending mobile body, a flexible endless conveyor disposed longitudinally in the forward end of said body for moving crops rearwardly into the latter, a laterally extending platform rigidly attached to said body, a transversely disposed conveyor mounted on said platform and adapted to deliver crops to said endless conveyor, an adjustable platform section pivotally connected to and extending forwardly from said laterally extending platform, and swingable vertically about a transverse axis, a cutter bar extending transversely along the forward edge of said adjustable section, and a flexible endless conveyor extending across said pivoted platform section behind said cutter bar and movable rearwardly therefrom, for delivering crops to the transverse conveyor.

3. A harvester comprising a narrow, longitudinally extending mobile body, a flexible endless conveyor disposed longitudinally in the forward end of said body for moving crops rearwardly into the latter, a conveyor trough extending laterally from said body and rigidly supported thereon, an auger mounted in said trough for moving crops to said endless conveyor, an adjustable platform section pivotally connected to and extending forwardly from said laterally extending platform, and swingable vertically about a transverse axis, a cutter bar extending transversely along the forward edge of said adjustable section, and a flexible endless conveyor extending across said pivoted platform section behind said cutter bar and movable rearwardly therefrom, for delivering crops to the transverse conveyor.

4. A harvester comprising a narrow, longitudinally extending mobile body, a flexible endless conveyor disposed longitudinally in the forward end of said body for moving crops rearwardly into the latter, a conveyor trough extending laterally from said conveyor at a higher elevation than the latter and rigidly attached to the body, an auger mounted in said trough for moving crops to said conveyor, a vertically adjustable platform section pivotally connected to said trough and extending across the forward end of said body, a cutter bar extending along the forward end of said platform section, and a flexible endless conveyor mounted on the latter and movable upwardly and rearwardly from said cutter bar and adapted to discharge a portion of the harvested crop upon said longitudinally disposed conveyor and the remainder into said trough to be conveyed laterally into said conveyor.

5. A harvester comprising a body having an opening in the forward end for receiving crops, a feeder housing extending forwardly from said crop receiving opening, a feeder conveyor in said housing, a conveyor trough extending laterally from said feeder housing and at a higher elevation than the floor of said housing, conveying means in said trough adapted to move crops toward said feeder house, a crop elevating platform extending forwardly from said feeder housing and said conveyor trough, a transverse cutter bar disposed along the forward end of said platform, and a draper on said platform having an upper flight movable in a single plane for moving crops rearwardly from said cutter bar and discharging a portion upon said feeder conveyor and delivering the remainder to said conveying means in said trough.

6. A harvester comprising a body having an opening in the forward end for receiving crops, a feeder housing extending forwardly from said crop receiving opening, a feeder conveyor in said housing, a conveyor trough extending laterally from said feeder housing and at a higher elevation than the floor of said housing, a flexible endless conveyor disposed in said trough and adapted to move crops toward said feeder house, a crop elevating platform extending forwardly from said feeder housing and said conveyor trough, a transverse cutter bar disposed along the forward end of said platform, and elevating means on said platform for moving crops rearwardly from said cutter bar and discharging a portion upon said feeder conveyor and delivering the remainder to said flexible endless conveyor in said trough.

7. A harvester comprising a body having an opening in the forward end for receiving crops, a feeder housing extending forwardly from said crop receiving opening, a harvester platform extending laterally from said feeder housing, a conveyor on said platform operative to move crops laterally to said housing, a flexible endless conveyor disposed longitudinally in said housing and upon which said platform conveyor is adapted to discharge crops, said flexible conveyor terminating intermediate of said housing, and adapted to discharge crops upon the rear portion of the floor of said housing, and a raddle conveyor spaced above said floor portion and movable rearwardly in engagement with said crops to sweep the same into said body.

8. A harvester comprising a body having an opening in the forward end for receiving crops, a feeder housing extending forwardly from said crop receiving opening, a conveyor trough extending laterally from said housing and at a higher elevation than the floor of the latter, an auger conveyor disposed in said trough for moving crops to said feeder house, a platform extending forwardly from said trough and from the forward end of said feeder house at a raised position above the latter, a cutter bar extending transversely across the forward end of said platform, a flexible endless conveyor movable rearwardly to convey crops from said cutter bar and deposit the same in said trough and feeder house, a separate flexible endless conveyor disposed in said feeder house beneath the ends of said trough conveyor and said platform conveyor, and terminating at an intermediate portion of said feeder house, and a raddle conveyor having a rearwardly travelling lower flight inclined downwardly and rearwardly over the rear end of said flexible conveyor and continuing rearwardly in spaced relation above said floor portion in engagement with said crops to sweep the same into said body.

9. A harvester comprising a body having an opening in the forward end for receiving crops, a harvester platform structure pivotally connected to said housing adjacent said opening and including a feeder housing extending forwardly from said crop receiving opening, a conveyor trough supported rigidly on said housing at a higher elevation than the floor of the latter and extending laterally therefrom, a transverse conveyor disposed in said trough for moving crops to said feeder house, a platform extending rigidly forwardly from said trough and from the forward end of said feeder housing at a raised position above the latter, a cutter bar extending transversely across the forward end of said platform, a flexible endless conveyor movable rearwardly to convey crops from said cutter bar and deposit the same in said trough and feeder house, a separate flexible endless conveyor disposed in said feeder house beneath the ends of said trough conveyor and said platform conveyor, and terminating at an intermediate portion of said feeder house, and a raddle conveyor having a rearwardly travelling lower flight inclined downwardly and rearwardly over the rear end of said flexible conveyor and continuing rearwardly in spaced relation above said floor portion in engagement with said crops to sweep the same into said body.

10. In a harvester, a platform conveyor including a transversely disposed trough open along the front end having crop gathering means disposed along the forward edge of the trough and an auger disposed in the trough for moving crops laterally to a point of discharge, said trough having a back wall opposite said gathering means, and means for rotatably supporting said auger in said trough including bearing means adjacent the end remote from said point of discharge and a bearing standard attached to said back wall and extending forwardly therefrom near said point of discharge.

11. In a harvester, a platform conveyor including a transversely disposed trough open along the front end having crop gathering means disposed along the forward edge and a generally vertical back wall opposite said gathering means, an auger disposed in the trough and spaced from said back wall for moving crops laterally to a point of discharge at one end, a stripper plate extending forwardly from the back wall and having a stripping edge adjacent the auger blade, and means for rotatably supporting said auger including bearing means at the other end of said trough and a bearing standard adjacent the discharge end of the trough and attached to the back wall at upper edge of the latter and curving forwardly and downwardly above said stripper plate to the auger.

12. In a harvester, a conveyor comprising a trough having one side open and a wall extending generally parallel thereto and spaced therefrom to provide space for material conveyed thereby, the upper end of said wall being extended forwardly toward the top of said auger and having a stripping edge adjacent the auger blades, a supporting standard fixed to said wall and arching over the top of said forwardly extending portion and projecting downwardly beyond said stripping edge, and a bearing for said auger at the end of said standard.

13. In a harvester, a feeder house, a platform trough extending laterally from one wall thereof, said trough having an end wall and a back wall, an auger disposed in said trough and supported by a bearing at one end mounted on said end wall, the opposite end of said auger terminating substantially at said wall of the feeder house, a stripper plate extending forwardly from said back wall and having a stripping edge adjacent the auger blades, a supporting standard fixed to said wall and arching over the top of said forwardly extending portion and projecting downwardly beyond said stripping edge, and a bearing for said auger at the end of said standard.

14. In a harvester, a platform trough having an end wall and a back wall, an auger disposed in said trough and supported by a bearing attached to said end wall, a second bearing in which said auger is journaled, spaced from said end wall bearing intermediate the ends of said auger, a standard for supporting said second bearing, said auger having a slot in its blade to accommodate said standard, and a stripper plate extending forwardly from said back wall over said auger, said standard extending upwardly from said bearing over said stripper plate and having means for mounting said standard on said back wall.

ALVIN W. OEHLER.